US011517977B2

(12) United States Patent
Ou et al.

(10) Patent No.: US 11,517,977 B2
(45) Date of Patent: Dec. 6, 2022

(54) DUAL CAM SERVO WELD SPLICER

(71) Applicant: Tech-Sonic, Inc., Columbus, OH (US)

(72) Inventors: Byoung Ou, Dublin, OH (US); David Lee Cyphert, Canal Winchester, OH (US); Jason E. Smith, Powell, OH (US)

(73) Assignee: Tech-Sonic, Inc., Columbus, OH (US)

( * ) Notice: Subject to any disclaimer, the term of this patent is extended or adjusted under 35 U.S.C. 154(b) by 0 days.

(21) Appl. No.: 15/927,114

(22) Filed: Mar. 21, 2018

(65) Prior Publication Data

US 2021/0346977 A1 Nov. 11, 2021

Related U.S. Application Data

(60) Provisional application No. 62/558,975, filed on Sep. 15, 2017.

(51) Int. Cl.
 *B23K 20/10* (2006.01)
 *B23K 20/00* (2006.01)
 *B23K 37/02* (2006.01)

(52) U.S. Cl.
 CPC ............ *B23K 20/10* (2013.01); *B23K 20/004* (2013.01); *B23K 37/0247* (2013.01); *B23K 37/0258* (2013.01)

(58) Field of Classification Search
 CPC .......... B23K 20/10–106; B23K 20/004; B23K 37/0247; B23K 37/0258; B23K 2101/38; B23K 1/06; B23K 20/22; B23K 20/26; H01R 43/0207; H01R 4/021; B29C 65/08

USPC ............... 228/1.1, 110.1; 156/73.1–73.4, 156/580.1–580.2
See application file for complete search history.

(56) References Cited

U.S. PATENT DOCUMENTS

| | | | | |
|---|---|---|---|---|
| 3,822,465 A | * | 7/1974 | Frankort | B23K 20/10 156/73.2 |
| 4,558,596 A | * | 12/1985 | McBrearty | B23K 20/10 228/1.1 |
| 4,603,802 A | * | 8/1986 | Kurtz | H01L 24/85 228/110.1 |

(Continued)

FOREIGN PATENT DOCUMENTS

| | | |
|---|---|---|
| CN | 105339124 A | 2/2017 |
| DE | 102004022313 B3 | 10/2005 |

(Continued)

*Primary Examiner* — Kiley S Stoner
(74) *Attorney, Agent, or Firm* — Mueller Law, LLC; Jerry K. Mueller, Jr.

(57) ABSTRACT

An ultrasonic welding apparatus joins metal pieces, such as wires, which are placed in a weldment zone where the metal pieces are subjected to pressure through a compressive height anvil and an adjustable width anvil, and intimate contact is made with a sonotrode of an ultrasonic stack. A first electric motor actuates movement of the height anvil to develop a compressive force for ultrasonic welding of the metal pieces. A second electric motor can position the width anvil before and during welding. A sensor, such as a load cell, measures the compressive force developed. The sensor directly can measure the load on the height anvil independent of the ultrasonic stack. A software algorithm can compensate for deflection of the load cell sensor and lost motion in the first electric motor actuating movement.

17 Claims, 11 Drawing Sheets

(56) References Cited

U.S. PATENT DOCUMENTS

| | | | | |
|---|---|---|---|---|
| 4,771,930 A * | 9/1988 | Gillotti | ............... | H01L 24/85 228/180.5 |
| 4,808,948 A * | 2/1989 | Patel | ............... | H03L 7/02 156/73.2 |
| 4,838,964 A * | 6/1989 | Thomsen | ............... | B29C 66/49 264/161 |
| 4,869,419 A * | 9/1989 | Nuss | ............... | B23K 20/106 228/110.1 |
| 4,968,369 A * | 11/1990 | Darcy | ............... | B29C 66/8161 226/93 |
| 4,993,618 A * | 2/1991 | Toyozawa | ............... | H01L 24/48 228/110.1 |
| 5,115,960 A * | 5/1992 | Shimizu | ............... | H01L 24/85 228/904 |
| 5,192,015 A * | 3/1993 | Ingle | ............... | H01L 24/01 228/180.5 |
| 5,603,790 A * | 2/1997 | Rhodes | ............... | B29C 66/84121 156/218 |
| 5,605,026 A * | 2/1997 | Schott | ............... | B65B 43/60 53/DIG. 2 |
| 5,658,408 A * | 8/1997 | Frantz | ............... | B29C 66/41 156/359 |
| 5,672,236 A * | 9/1997 | Frey | ............... | H01M 50/469 425/174.2 |
| 5,679,207 A * | 10/1997 | Palone | ............... | B65H 19/1852 156/507 |
| 5,788,791 A * | 8/1998 | Grewell | ............... | B23K 20/10 156/308.2 |
| 5,855,706 A * | 1/1999 | Grewell | ............... | B29C 65/7841 156/359 |
| 5,884,835 A * | 3/1999 | Kajiwara | ............... | H01L 24/85 228/110.1 |
| 6,039,234 A * | 3/2000 | Toner | ............... | B23K 20/004 228/8 |
| 6,105,848 A * | 8/2000 | Horibe | ............... | H01L 24/48 228/180.5 |
| 6,152,350 A * | 11/2000 | Hayashi | ............... | B29C 65/749 228/103 |
| 6,299,052 B1 * | 10/2001 | Wnek | ............... | B23K 20/10 228/110.1 |
| 6,667,625 B1 * | 12/2003 | Miller | ............... | H01L 24/85 228/104 |
| 8,308,049 B2 * | 11/2012 | Nakao | ............... | H01L 24/85 228/110.1 |
| 8,381,967 B1 * | 2/2013 | Masumoto | ............... | B23K 1/0016 228/234.1 |
| 9,586,361 B2 * | 3/2017 | Klinstein | ............... | B29C 66/45 |
| 9,694,537 B2 * | 7/2017 | Kato | ............... | B29C 66/942 |
| 9,849,627 B2 * | 12/2017 | Klinstein | ............... | B29C 66/80 |
| 2004/0129366 A1 * | 7/2004 | Nuss | ............... | B29C 66/94 156/73.1 |
| 2006/0097029 A1 * | 5/2006 | Kainuma | ............... | B23K 20/10 228/110.1 |
| 2006/0144904 A1 * | 7/2006 | Mlinar | ............... | B29C 66/41 228/101 |
| 2006/0243367 A1 * | 11/2006 | Engelhart | ............... | D04H 1/555 156/73.2 |
| 2007/0068991 A1 * | 3/2007 | Handel | ............... | B23K 20/106 228/1.1 |
| 2009/0152325 A1 * | 6/2009 | Frank | ............... | B29C 65/08 228/103 |
| 2010/0004108 A1 * | 1/2010 | Abrahamsen | ............... | B29C 66/112 53/133.2 |
| 2010/0065613 A1 * | 3/2010 | Nasu | ............... | H01L 24/81 228/110.1 |
| 2010/0218881 A1 * | 9/2010 | Yamamoto | ............... | B29C 66/81427 156/580.2 |
| 2012/0284904 A1 * | 11/2012 | Otsubo | ............... | B29C 66/4312 2/400 |
| 2013/0202984 A1 * | 8/2013 | Snelson | ............... | H01M 4/8896 156/60 |
| 2013/0221067 A1 * | 8/2013 | Lee | ............... | B23K 20/00 228/1.1 |
| 2013/0306216 A1 * | 11/2013 | Cai | ............... | B23K 20/106 156/64 |
| 2014/0367018 A1 * | 12/2014 | Klinstein | ............... | B29C 66/9231 156/64 |
| 2015/0044496 A1 * | 2/2015 | Oshima | ............... | H01L 24/83 228/110.1 |
| 2015/0136839 A1 * | 5/2015 | Kanryo | ............... | H01G 13/00 228/110.1 |
| 2015/0246480 A1 * | 9/2015 | Sano | ............... | B29C 66/92441 428/474.9 |
| 2016/0116355 A1 * | 4/2016 | Stroh | ............... | G01L 5/0076 702/43 |
| 2017/0043526 A1 * | 2/2017 | Ohki | ............... | B29C 65/08 |
| 2017/0225275 A1 * | 8/2017 | Hwang | ............... | B23K 31/125 |
| 2017/0252978 A1 * | 9/2017 | Claes | ............... | B33Y 50/02 |
| 2017/0305129 A1 * | 10/2017 | Oorui | ............... | B32B 15/08 |
| 2019/0224777 A1 * | 7/2019 | Solenthaler | ............... | B23K 37/04 |
| 2019/0308373 A1 * | 10/2019 | Shi | ............... | B29C 66/72141 |
| 2020/0232498 A1 * | 7/2020 | Ikada | ............... | B29C 66/942 |

FOREIGN PATENT DOCUMENTS

| | | | | |
|---|---|---|---|---|
| DE | 102015221615 A1 | | 5/2017 | |
| DE | WO-2017216199 A1 * | | 12/2017 | |
| EP | 2484511 A1 * | | 8/2012 | ............ B29C 65/08 |

* cited by examiner

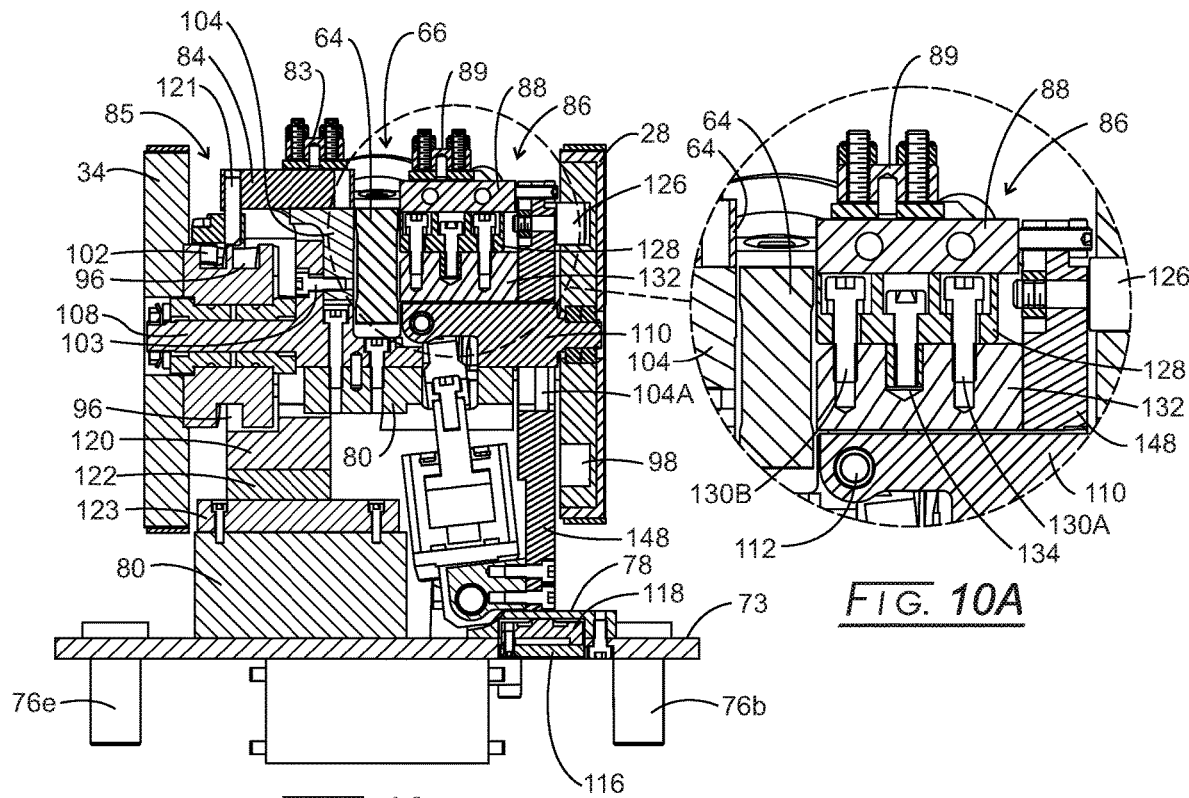
FIG. 10
FIG. 10A
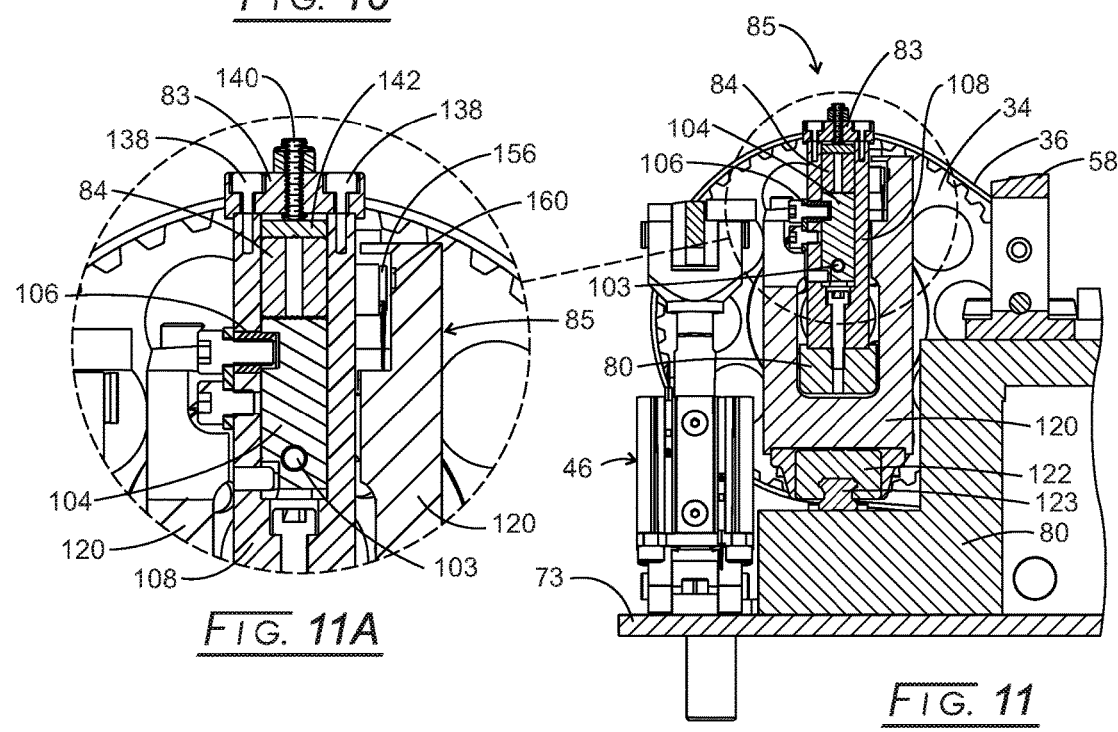
FIG. 11A
FIG. 11

DUAL CAM SERVO WELD SPLICER

CROSS-REFERENCE TO RELATED APPLICATIONS

This application claims benefit of provisional 62/558,975 filed Sep. 15, 2017.

STATEMENT REGARDING FEDERALLY SPONSORED RESEARCH

Not applicable.

BACKGROUND

The use of high-frequency ultrasonic vibrations to create a weld between materials has been known since the 1960s. Ultrasonic welders create a weld using friction generated by the ultrasonic vibrations applied to the materials, rather than application of heat to the materials. Ultrasonic welding has proven to be effective in joining both plastics and metals, and has been applied in a number of industries, from toy production to the automotive and aerospace industries. Ultrasonic welds are popular due to the ease with which a weld can be created and the low cost per weld. Ultrasonic welds are ideal for joining small parts.

Ultrasonic welding is an alternative method to arc or heat welding, or soldering, eliminating consumables, such as solder or flux, component burn back, cooling water requirements and high-energy use. An additional advantage of ultrasonic welding operations is the minimal heat that is generated during the welding process, minimizing component damage.

Ultrasonic metal welding is adapted for the assembly of similar and dissimilar non-ferrous metals used in electronic components and pipe sealing. Parts to be joined by ultrasonic welds are held together under pressure between the ultrasonic horn and anvil. Ultrasonic vibrations of a frequency of about 20 to 40 kHz are applied, and vibration of the horn causes the parts to scrub together, with resultant shear forces removing surface contaminants and exposing bare metal areas.

This intense friction applied to the weld as the two parts are simultaneously pressed together breaks the oxide skins of the substrate metals. When applied to metals, a weld is achieved not by melting materials, but through the creation of a solid-state weld. The ultrasonic vibrations cause shearing and deformation of surface asperities, which disperses oxides and contaminants existing on the subject materials, which allows for metal-to-metal contact and bonding of the adjacent surfaces. These processes bring the two materials into sufficiently intimate contact for atomic level bonding to occur. The materials' atomic structures are co-mingled creating a strong, surface molecular, solid-state bond that is clean and has low electrical resistance. The relatively slight rise in temperature created by the friction is well below melting point and plays no essential part in creating the weld.

Ultrasonic welds are achieved in plastics and metals through different processes. When applied to plastics, the friction created by the ultrasonic vibrations is sufficient to melt the joined portions of the materials, creating a weld when cooled. The weld time for an ultrasonic weld is typically very short, with weld times generally ranging between 200 and 400 milliseconds. For additional general disclosure regarding ultrasonic welding, see New Developments in Advanced Welding, Nasir Ahmed, ed. (2005).

The basic components of ultrasonic welding systems are a press, an anvil, an ultrasonic stack, an ultrasonic generator or power supply, and an electronic controller. The workpieces to be welded are placed between the press and the anvil, with the press applying pressure to the pieces. The anvil allows the ultrasonic vibrations to be directed to the surfaces of the materials. The nest or anvil, where the workpieces (parts) are placed, allows the high frequency vibration generated by the stack to be directed to the interfaces of the weld substrates.

The ultrasonic stack is commonly composed of a converter, a booster, and a Sonotrode or "horn." The converter converts the electrical energy into a mechanical vibration; the booster modifies the amplitude of the vibration; and the sonotrode applies mechanical vibration to the parts to be welded. These three elements are typically tuned to resonate at the same ultrasonic frequency (typically 20, 35 or 40 kHz). These stack components are connected to an electronic ultrasonic generator that delivers high power AC signal to the stack, while matching the resonance frequency of the stack.

The user issues commands for the system via the controller, which controls the movement of the press, actuates the stack power supply, conveying weld inducing electrical signal to the ultrasonic stack. The converter portion of the stack converts the electrical signal into a mechanical vibration, while a booster can be utilized to modify the vibration amplitude. The horn applies the vibrations to the workpiece.

The quality and success of an ultrasonic weld is dependent on a number of factors, including signal amplitude, weld time, weld pressure, weld speed, hold time, and hold pressure. The appropriate amount of each of these factors is affected by the types of subject materials for the weld, and can also vary within a single material. For the majority of the history of the industry, the only variables that could be effectively controlled were amplitude, force, and weld time or duration. Amplitude was controlled through a combination of frequency selection, the design of the horn and booster, and modulation of electrical inputs to the converter.

User control of the variables and processes of an ultrasonic weld is key to achieving effective welds consistently. Better process control generally translates to improved quality of welds, as well as improved consistency and repeatability of welds. Common products in the industry produce welds with standard deviations of 2% to 4% when the weld quality between individual products is examined.

Pneumatically actuated ultrasonic welding systems are common in the industry. These systems utilize pneumatic cylinders to control the force and down speed of the stack. In a pneumatic system, the entry and exhaust rate at which the air contained moves through the pneumatic actuators of the system is limited. Consequently, the pneumatic systems are unable to achieve abrupt changes in direction and velocity, as well as limiting the system's distance control. A system that is able to adjust its velocity instantaneously to adapt to variations in the materials would ideally produce perfectly consistent welds. Reduced deviations in weld quality will occur when the system's control over velocity and distance is improved.

Pneumatic systems also use static pressure to compress parts engaged by the system. As variations in the subject materials may affect the ideal pressure to be employed, a static pressure is more likely to result in a weaker weld than a system that can apply dynamic pressure to adapt to the conditions presented by the materials. The character of pneumatic systems further provides limited control over the movement and positioning of the horn face. These systems commonly utilize only approximately ¼ of the available welding surface. Thus, the horn face is unevenly worn during use, and the active face becomes excessively worn, while other portions of the weld head remain usable. The weaknesses in pneumatic ultrasonic welding systems lead to greater than ideal standard deviations between welds, as well as reduced adaptability to outside contaminants and weld material variations.

An ideal ultrasonic welding system provides the user with control over the maximum number of the variables in the process. Variations between materials, as well as variations in contaminants present in a material can necessitate adaptability in weld velocity and compression force to maintain weld strength. Common systems, including pneumatic ultrasonic welding systems, often lack the necessary variability in weld speed and pressure to complete an ideal weld. Pneumatic systems also suffer great drops in quality of their welds when outside contaminants, such as grease, and oil, which are often present in industrial air supplies, are able to infiltrate the system. Moreover, existing pneumatic systems are unable to fully utilize the horn surface, or to position the work-piece dynamically in relation to the anvil and horn.

There is a continuing need in new industrial situations to allow welding as a wire splice solution. In particular, the bundling of 5 to 10 stranded, braided or magnet wires to create a uniform wire splice, wire crimp or a battery cable splice is needed. Such connections are commonly used in the automotive, aircraft, computer and consumer electronics industries, as well as other process control and industrial instrument applications. Most commonly it is used in the production of wire harnesses. Unfortunately, the bundling of wires through a welding operation must be electrically complete, and mechanically strong, without stray unbounded wire strands being present in the final harness.

An ultrasonic welding system is desired that provides greater control over common variables in ultrasonic welding than is currently available in the marketplace. A system providing for dynamic applied force and selectable workpiece/anvil positioning would serve as an improvement on commonly available pneumatic or static position ultrasonic welding systems. An ideal system would further provide the ability to utilize the full width of the welding head, which would reduce wear on the welding head, thus extending the usable life of the head.

BRIEF SUMMARY

An ultrasonic welding apparatus joins metal pieces, such as wires, which are placed in a weldment zone where the metal pieces are subjected to pressure through a compressive height anvil and an adjustable width anvil, and intimate contact is made with a sonotrode of an ultrasonic stack. A first electric motor actuates movement of the height anvil to develop a compressive force for ultrasonic welding of the metal pieces. A second electric motor can position the width anvil before and during welding. A sensor, such as a load cell, measures the compressive force developed. The sensor directly can measure the load on the height anvil independent of the ultrasonic stack. A software algorithm can compensate for deflection of the load cell sensor and lost motion in the first electric motor actuating movement.

Another aspect of the disclosure is a method for ultrasonic welding of wires with an ultrasonic apparatus where metal pieces to be joined are placed in a weldment zone where the metal pieces are subjected to pressure though a compressive height anvil and an adjustable width anvil, and intimate contact is made with a sonotrode of an ultrasonic stack, a first electric motor actuating movement of the height anvil to develop a compressive force for ultrasonic welding of the metal pieces, and a controller containing a welding algorithm effecting the method. The steps of the method commence with determining a height compensation by applying force in an empty weldment zone at varying forces and measuring the height in the weldment zone to create a height compensation. A table is created correlating the applied force and height compensation just determined. Force is applied to wires in the weldment zone for joining the wires. The height of the wires is measured in the weldment zone under force and the height compensation is subtracted for determining the actual height of the wires.

A further aspect is a method of calibrating an ultrasonic welding apparatus. This calibration method commences by actuating a first electric motor to cause a height anvil to apply a plurality of compressive forces to an empty weldment zone. A force applied to the empty weldment zone is measured with a load sensor for each of the plurality of compressive forces. A controller receives a measured height from a position encoder of the first electric motor for each of the plurality of compressive forces. A table correlating the applied force and height compensation determined is created, and stored.

These and other aspects and features will be described in detail below.

BRIEF DESCRIPTION OF THE DRAWINGS

For a fuller understanding of the nature and advantages of the present method and process, reference should be had to the following detailed description taken in connection with the accompanying drawings, in which:

FIG. 4A is an enlarged view of the open aperture mode of the disclosed weld splicer in FIG. 4;

FIG. 5A is an enlarged view of the open aperture mode of the disclosed weld splicer in FIG. 5;

FIG. 10 is a sectional view taken along line 10-10 of FIG. 4;

FIG. 10A is an enlarged view of the height anvil slide assembly shown in FIG. 10;

FIG. 11 is a sectional view taken along line 11-11 of FIG. 4;

FIG. 11A is an enlarged view of the width anvil assembly shown in FIG. 11;

The drawings will be described in greater detail below.

DETAILED DESCRIPTION

Figure 1:
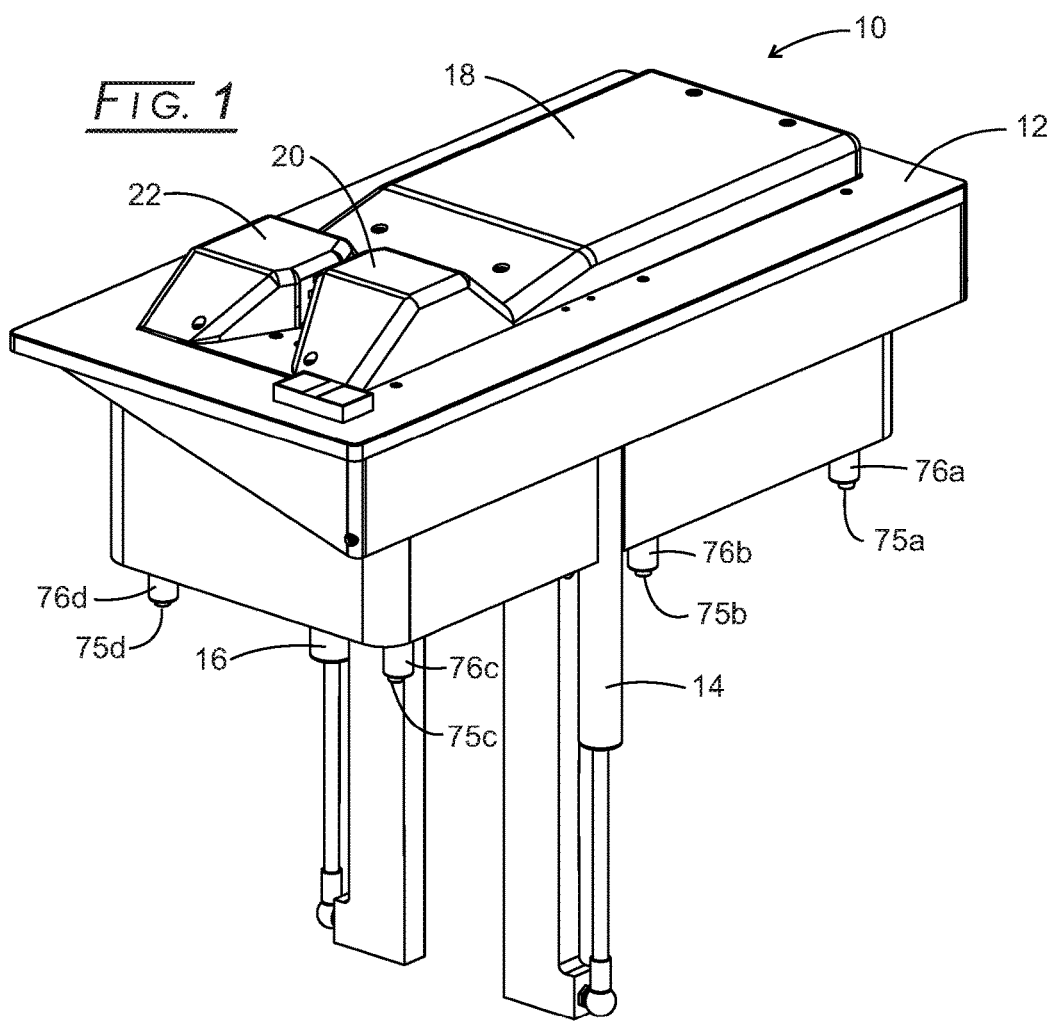
FIG. 1 is an isometric view of the disclosed dual cam servo weld splicer with the table in its lower or home position.
Figure 2:
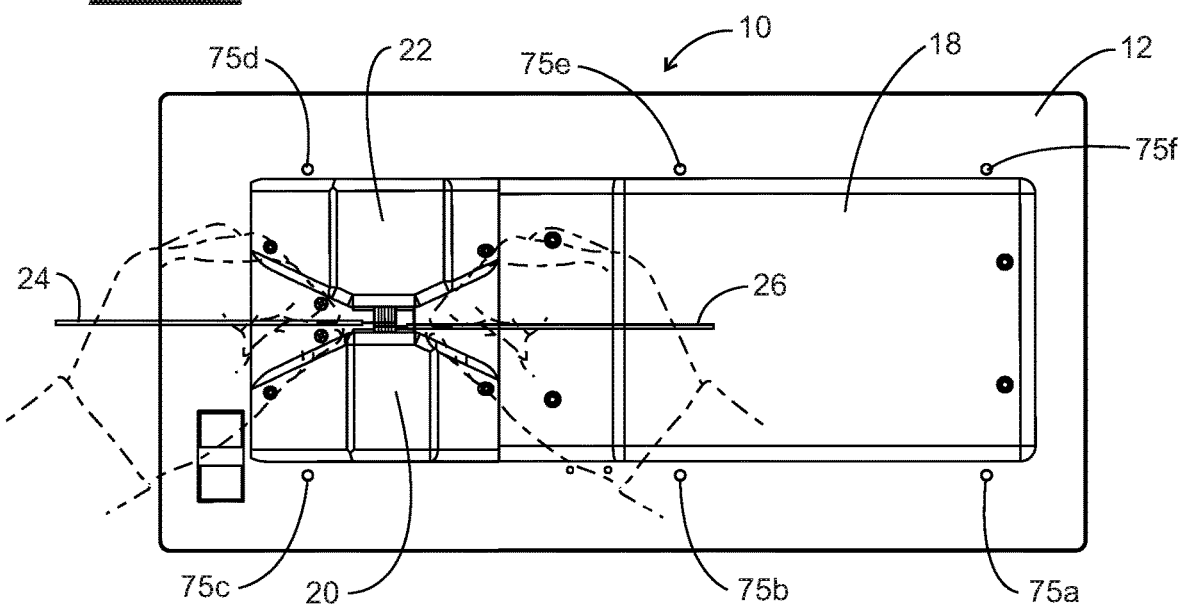
FIG. 2 is a top view thereon.

The weld splicer machine, 10, generally is shown in FIG. 1. A table, 12, is supported by a pair of cylinders, 14 and 16, which raise and lower weld splicer machine 10 in table 12. A stack cover, 18, covers the stack assembly, which will be revealed and described later herein. A pair of finger safe cover assemblies, 20 and 22, cover the width anvil assembly, the height anvil assembly, and the horn, whereat the weld splicing occurs. In FIG. 2, the user's hands, shown in phantom, place wires, 24 and 26, in between finger safe cover assemblies 20 and 22 for ultrasonically weld splicing together wires 24 and 26. Of course, it will be appreciated that single strand wire, multi-strand wire, and additional workpieces can be ultrasonically welded with disclosed weld splicer machine 10.

Figures 3, 3A:
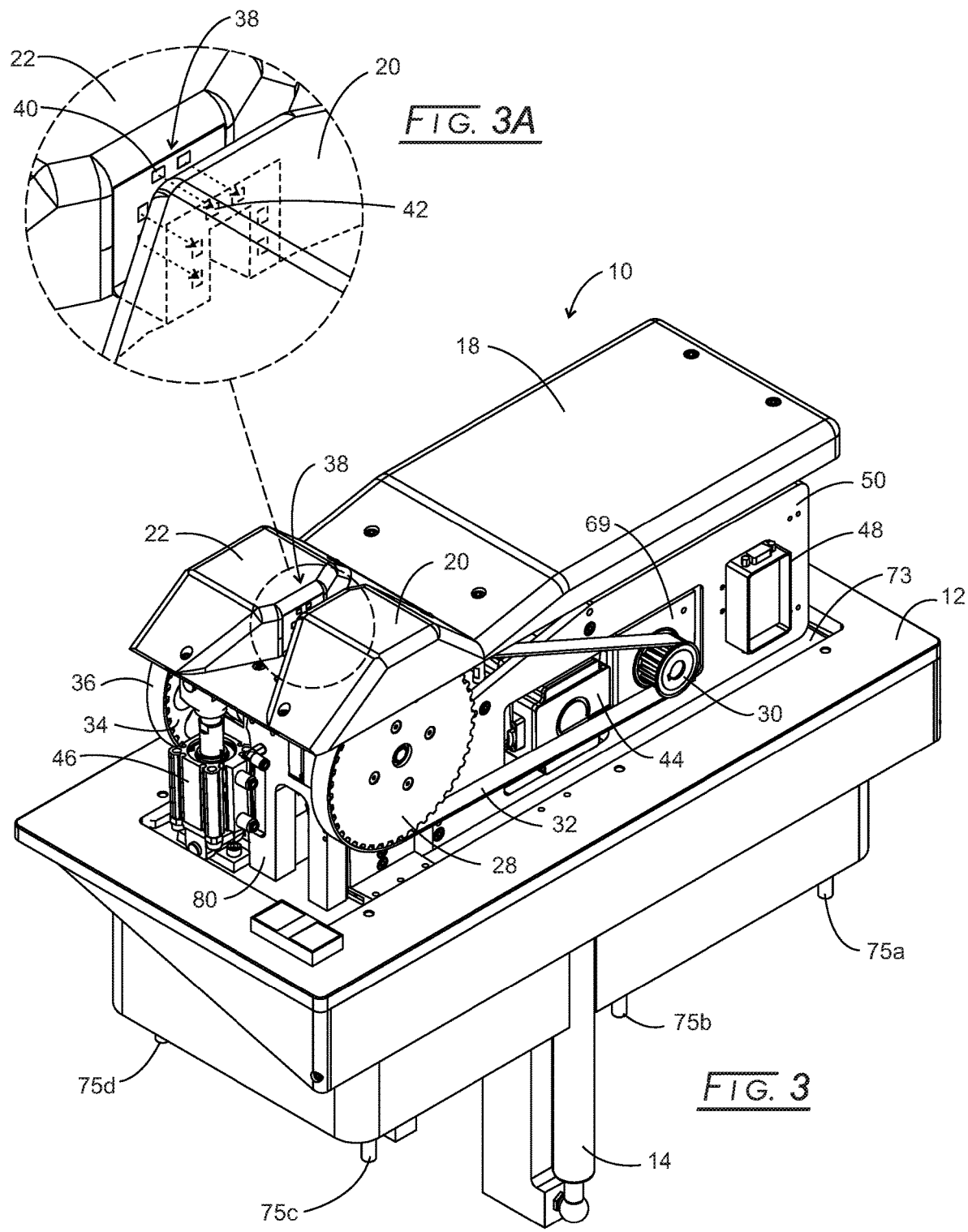
FIG. 3 an isometric view of the disclosed dual cam servo weld splicer with the table in its raised or service position.
FIG. 3A is an enlarged view of the infrared finger safe assembly.

In FIGS. 3 and 3A, weld splicer machine 10 in table 12 has been raised from its home position as shown in FIG. 1, to engage in repair and maintenance activities position as might be required from time to time. A height (vertical) cam assembly, 28, is shown with a motor pulley, 30, around which a timing belt, 32, runs. A height cam assembly, 28, is part of the height cam assembly shown in detail in FIG. 6 and elsewhere herein. A width cam assembly, 34, with a timing belt, 36, is part of a width cam assembly shown in detail in FIG. 7 and elsewhere herein.

The exploded view in FIG. 3A is an infrared (IR) finger assembly, 38, which includes an IR transmitter, 40, and IR sensor or receiver, 42 (shown in phantom), for receiving the IR light. When the IR light is interrupted, such as by the fingers of a user, weld splicer 10 cannot weld as a safety feature so as to not injure the user. The perimeter of the safe area is determined by an array of IR transmitters and IR sensors.

Also seen in FIG. 3 are horizontal and vertical cam servomotors, 44 and 69, respectively, that actuates horizontal and vertical cam assemblies, described in detail later herein. Width (horizontal) and height (vertical) servo drive motors are coupled to their respective driven assemblies by timing belts and toothed pulleys. These drive motors have high-resolution absolute encoders built in to report the position of the weld anvils. Also shown in FIG. 3 is a cutter cylinder assembly, 46, for cutting bad welded wires. A force sensor signal conditioner, 48, is seen mounted to right side motor plate, 50.

Figure 4:
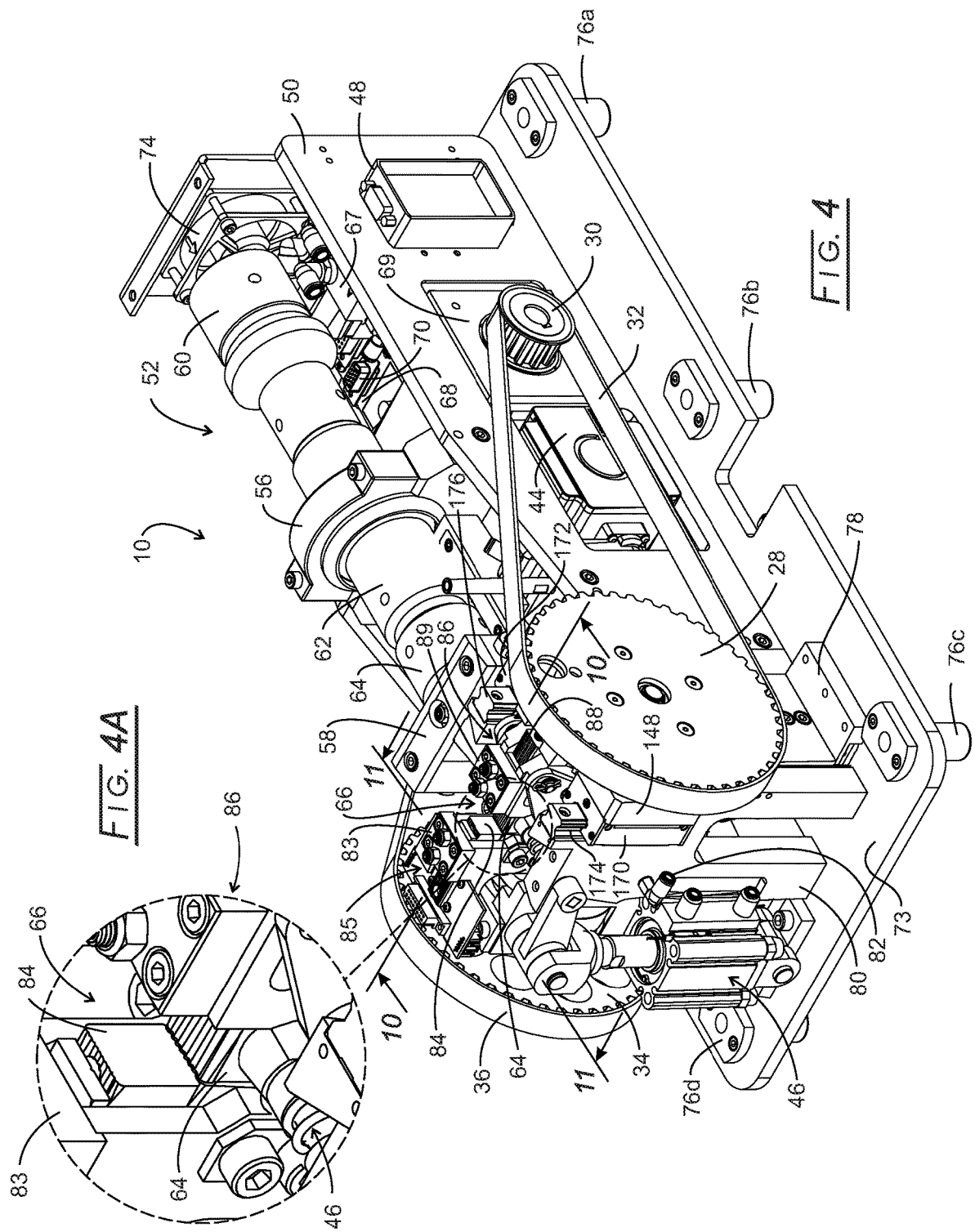
FIG. 4 is an isometric view like that in FIG. 3, but with the stack cover and finger safe cover assemblies removed.

Referring now to FIGS. 4 and 4A, additional detail is provided for weld splicer 10 by removal of various covers. A stack assembly, 52, is seen supported about the center by a booster mount, 56, and about its proximal end by a front nodal support assembly, 58. Stack assembly 52 includes a converter, 60, at the distal end, a booster, 62, with booster mount 56 located about the midpoint of booster 62, and a horn, 64, at the proximal end and extending into an open aperture, 66, whereat ultrasonic welding occurs and as detailed in FIG. 4A. A height anvil slide assembly, 86, is located forward of front nodal support assembly 58 and adjacent to horn 64.

Figure 15:
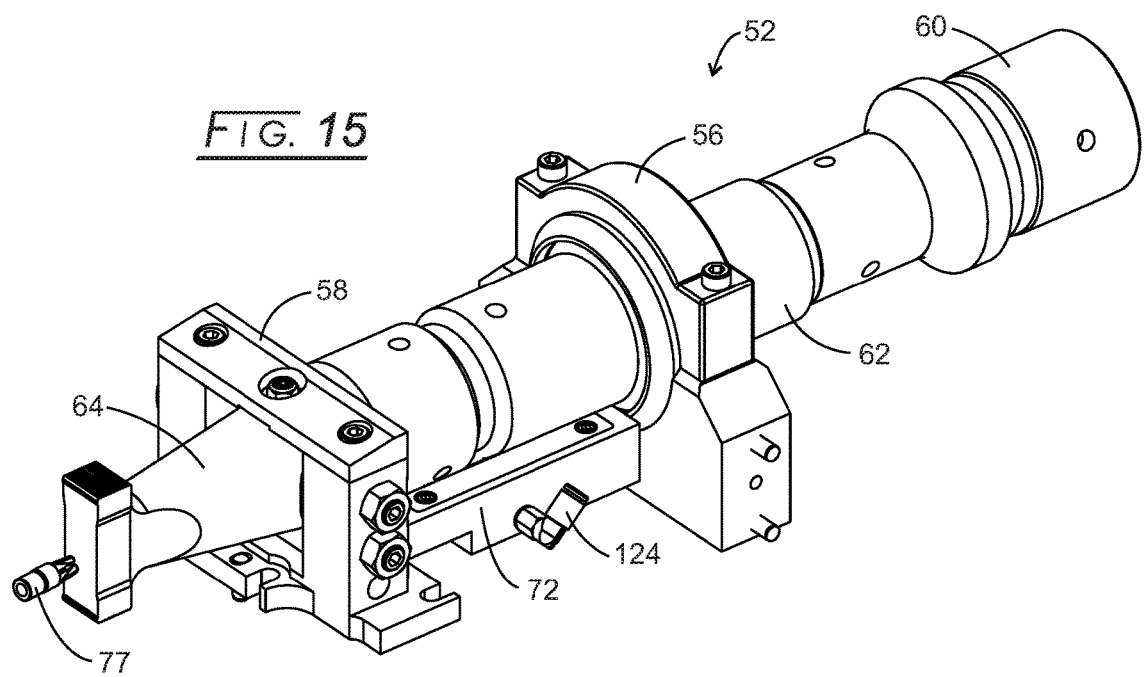
FIG. 15 is an isometric view of the stack assembly.

A circuit board, 68, with connector, 70, is seen located beneath converter 60, just ahead of a control valve assembly, 72, and just below a cooling fan assembly, 74. Circuit board 68 connects to a controller, such as, for example, a Beckhoff CX5020 controller with TwinCat2 software running Windows CE software or a Beckhoff CX5130 controller running Windows 7 embedded; although, other controllers and software can be used to advantage. Linear bearings are affixed to a base plate, 73, as illustrated by 76a-76f (see also FIG. 5). Linear bearings 76a-76f ride on guide rods, 75a-75f, attached to table 12 for raising and lowering weld splicer machine 10 in table 12 (see FIGS. 1-3). The weld force measuring load cell is located under a load cell fixed plate, 78, which is attached to base plate 73. The load cell sensitive contact point rests on the underside of fixed plate 78 and is connected to the height anvil assembly by means of connecting rods, 114a and 114b (threaded studs), as detailed in the width height cams assembly in FIG. 6. A main or tooling frame assembly, 80, also attached to base plate 73, can be seen adjacent to cutter cylinder assembly 46 with an air port, 82, on the upper front face of frame assembly 80. Air port 82 supplies cooling air through a manifold in frame assembly 80 to an air nozzle, 77, that cools the front of the horn (seen in FIG. 15).

Looking now to FIG. 4A, the open aperture mode is seen in enlarged view. Horizontal width anvil retainer, 83, mounts a width anvil, 84, while horn 64 is located inwardly and below width anvil 84. Height anvil assembly, 86, is located above horn 64 and across from width anvil 84. The cutter of cutter cylinder assembly 46 is located in front of horn 64 for cutting bad weld wires, as further detailed in FIGS. 5 and 5A.

Figure 5:
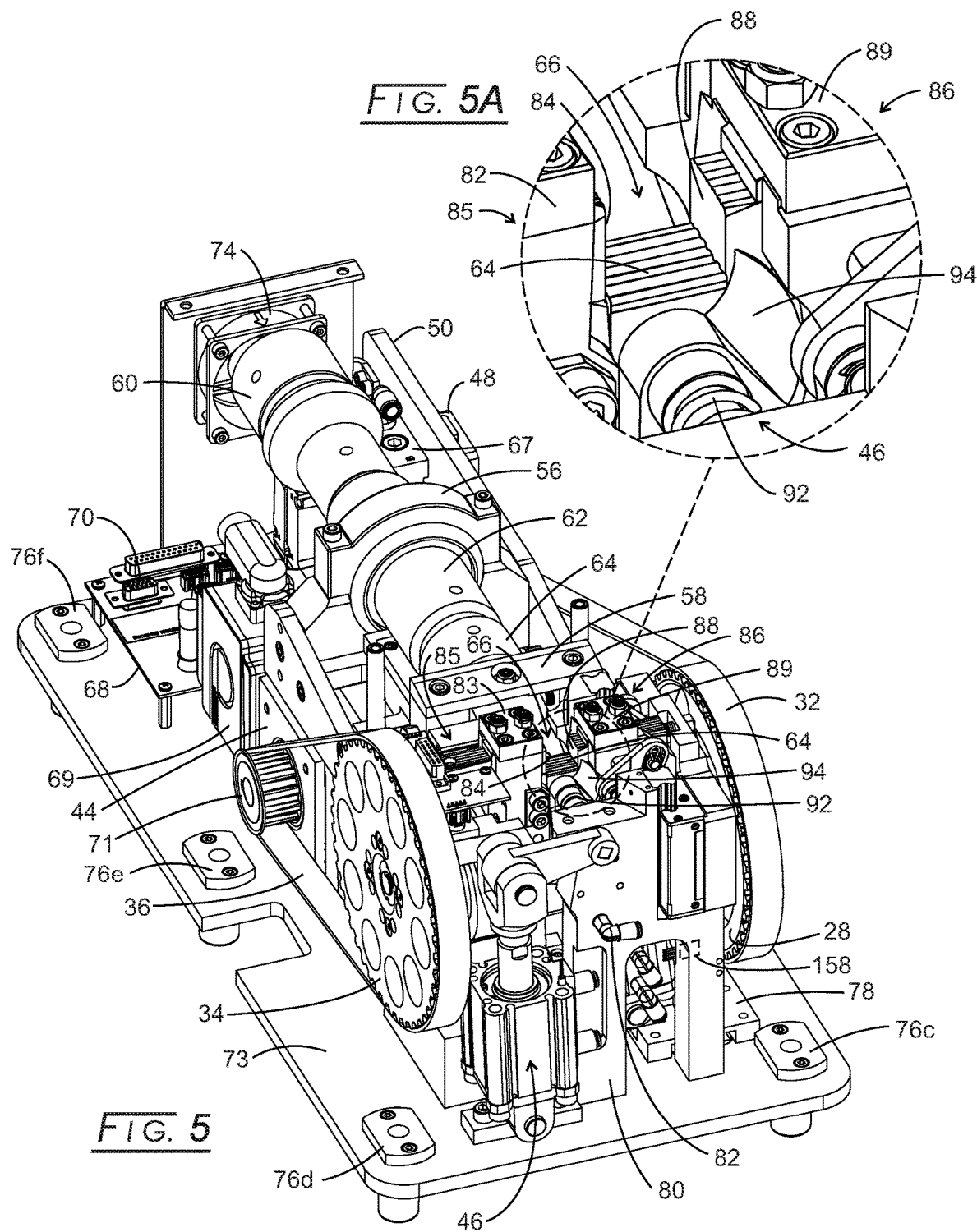
FIG. 5 is an isometric view like that in FIG. 4, but of the other side of the weld splicer.

Looking now to FIGS. 5 and 5A, height anvil assembly 86 includes, inter alia, a height anvil, 88, and a height anvil retainer, 89 (see FIG. 5A). Cutter assembly 46 is spring biased with a spring, 92, and a cutter, 94, which rotates to cut bad wire welds. Again, the open aperture mode of the disclosed weld splicer is shown is FIGS. 5 and 5A. Vertical cam motor, 69, also is seen in FIG. 5 along with a motor pulley, 71, for timing belt 36.

Figure 6:
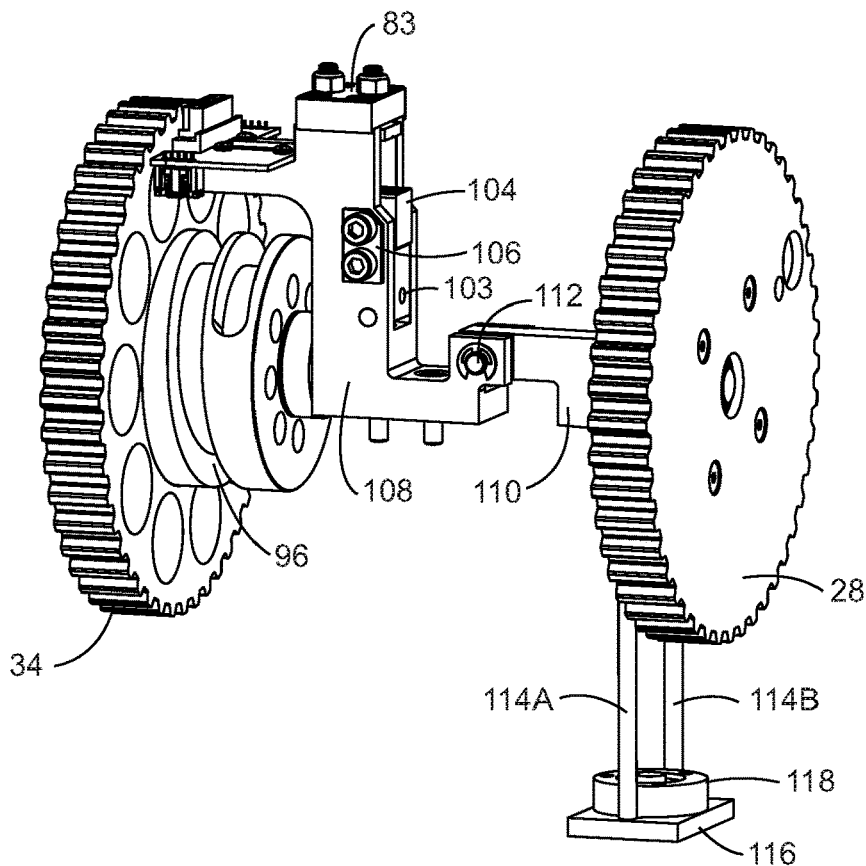
FIG. 6 is an isometric view of the width cam assembly.
Figure 7:
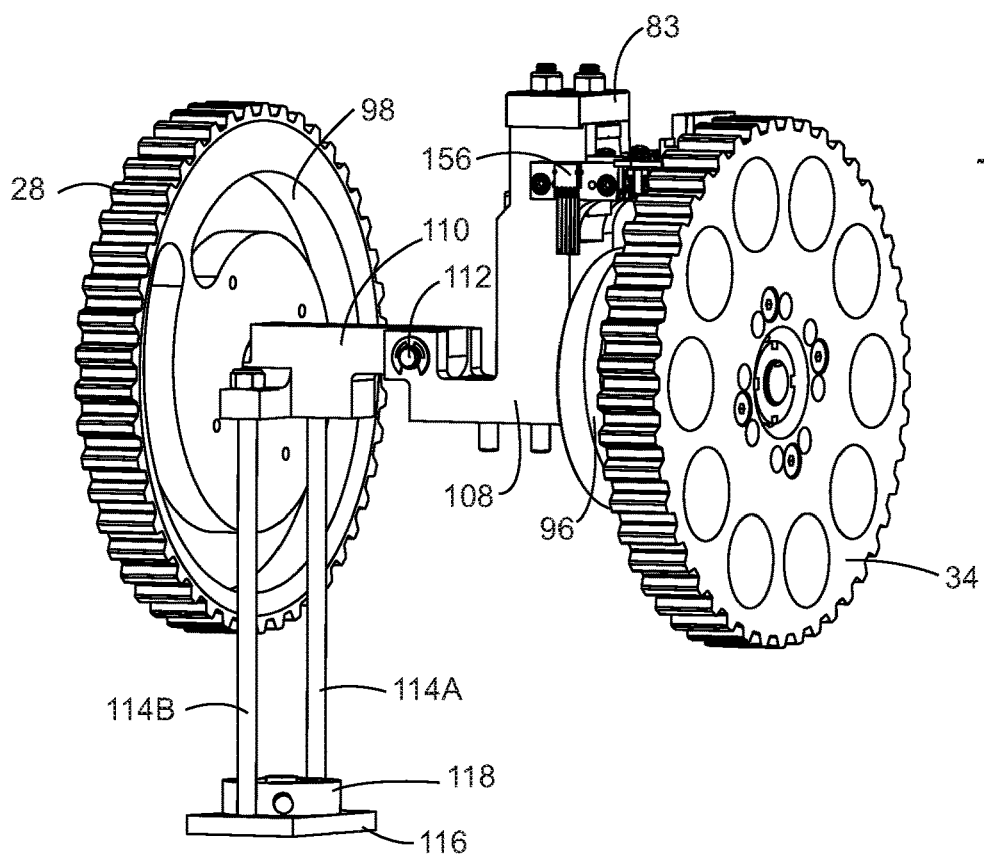
FIG. 7 is an isometric view of the height cam assembly.

The dual cams utilized in weld splicer 10 are illustrated in FIGS. 6 and 7 for the width anvil and height anvil, respectively. This assembly is made up of fixed rotation axis width cam 34 having a cam track, 96, cut into the perimeter face and a pivoting height cam, 28, with a cam track, 98, cut into the side face. Width anvil assembly 85 is coupled to width cam track 96 with two cam followers, 100 and 102 (see FIG. 9). The dual cam followers, 100 and 102, eliminate backlash for precise bi-directional width positioning. A stationary width side guide, 104 (see FIG. 10), is part of this assembly. The purpose of width side guide 104 is to prevent wire strands from being drawn under width anvil 84, as well as provide precise vertical gap positioning of width anvil 84 relative to horn 64 (sonotrode) wave weld surface. Width side guide 104 is positioned laterally about 0.5 mm from horn 64. The side guide 104 provides the height control for the tooling gap. This positioning is accomplished with the width side guide cam assembly, 106. Socket head cap screw, 103 (SHCS) locks side guide 104 in the final position. A cam support shaft assembly, 108, holds both side guide 104 and width guide cam assembly 106 in position, and is rigidly attached to main tooling frame assembly 80. A vertical cam shaft, 110, pivots on a dual bearings/pin assembly, 112, and vertical cam shaft 110 is attached to two downwardly threaded studs, 114A and 114B, which affix to a load cell base plate, 116, which holds a force transducer, 118. Height cam assembly 28 rotates on vertical camshaft 110.

When height anvil assembly 86 is pulled downward by the height cam 28 during the process of compaction, it is deflected upward causing compression of force transducer 118 on load cell fixed plate 78 attached to base plate 73 that in turn reports the load on horn 64 in stack assembly 52. Since height cam 28 is driven by flexible timing belt 32, the slight upward arcuate movement of the cam does not affect the drive train function. The upward deflection resulting from force transducer 118 deflection under varying weld forces will result in position reporting errors. The position reporting encoders for both drive motors 44 and 69 are located in the motors. Therefore, the height encoder does not report the actual height during compression due to this position error. In order to compensate for this error, a calibration method is necessary. During calibration, height anvil assembly 86 is lowered until contact with horn 64 tip occurs. Force transducer 118 reports this error free position upon contact. As height anvil assembly 28 continues to rotate causing the weld force to increase, force transducer 118 continues to report the rotation. Since height anvil assembly 86 is not moving downward any longer, due to the contact with stationary horn 44, the pulses from the height encoder (see discussion in following paragraph) are reporting mechanical lost motion, which is proportional to the force applied. A compensation table is created based on the force/position error. This compensation table is utilized during weld compaction in order to accurately report the weld height.

Table 1 provides an example calibration table illustrating how height measurement is compensated based on the force reading.

TABLE 1

| Force Target (N) | Measured Force (N) | Height Compensation (mm) |
|---|---|---|
| 0.0 | 0.0 | 0.0 |
| 48 | 46 | −0.0577 |
| 96 | 94 | −0.1705 |
| 144 | 142 | −0.1864 |
| 192 | 191 | −0.1986 |
| 240 | 241 | −0.2108 |
| 288 | 284 | −0.2210 |
| 336 | 335 | −0.2235 |
| 384 | 382 | −0.2438 |
| 432 | 433 | −0.2545 |
| 480 | 478 | −0.2618 |
| 528 | 529 | −0.2702 |
| 576 | 577 | −0.2784 |
| 624 | 623 | −0.2867 |
| 672 | 672 | −0.2957 |
| 720 | 720 | −0.3050 |
| 768 | 769 | −0.3146 |
| 816 | 813 | −0.3231 |
| 864 | 861 | −0.3315 |
| 912 | 913 | −0.3397 |
| 960 | 959 | −0.3463 |
| 1008 | 1006 | −0.3537 |
| 1056 | 1058 | −0.3638 |
| 1104 | 1105 | −0.3734 |
| 1152 | 1148 | −0.3819 |

Table 1 was created using the following method:
1) The force target step size is computed for 25 values from 0 to the max force to be used, in this case 1150 N (rounded up for integer step size).
2) The system was run with nothing in the gap between the anvils.
3) The force control target was set to the desired force and measured force and measured height were collected for a short time period, averaged, and saved in this table.

Because there was nothing in the gap between the anvils, the height reading should have been 0.0 for any force applied. Because the height reading changed (Height Compensation), this measured value must be due to lost mechanical motion in the hardware driving the anvils. So, to obtain a precise height reading of the distance between the anvils, the system takes the height reading from the sensor and subtracts the value from the Height Compensation at the force being used. This gives a precise measurement, compensating for lost mechanical motion.

The calibration table can be used as a lookup table, interpolating between the recorded values to compute compensation values, or used to compute an equation that can provide the height compensation by plugging in the measures force. By doing a least squares fit to a linear equation with this data, examination of the "y" crossing value (i.e., "b" in y=mx+b), the actual position of zero height can be determined.

Ultrasonic wire bonding is performed by applying vibrational energy to a bundle of wires, squeezed together between an ultrasonic horn and an anvil. The amount of energy being delivered by the horn is directly related to the amplitude of the ultrasonic vibration and the force being applied to the weld. There are two basic ways to define how to implement a weld:
1. Define the amplitude of the ultrasonic vibration, the force applied to the weld, and the amount of energy to be delivered. The welder will run for as long as it takes to deliver the desired energy to the weld. This is a "Weld to Energy" mode of wire splice welding.
2. Define the amplitude of the ultrasonic vibration, the force applied to the weld, and the how long the welder is to run. The welder will run on a time basis and the amount of energy delivered to the weld will depend largely on the forces being applied between the horn and the anvil. This is a "Weld to Time" mode.

This disclosure has expanded on these two ways to weld by introducing a "weld force table", which allows controlling the amplitude and force applied during the weld, which controls how fast the energy is delivered to the weld; thus, providing better welds at lower energy. This "Weld Force Table" will work with either welding method—weld to time or weld to energy.

The Weld Force Table is a sequence of directions on how a weld is to be performed. Each entry in the Weld Force Table consists of 3 values: Duration, Force, and Amplitude. The Duration is how long the step is to last, the force is the target for the vertical anvil servo control, and the amplitude is converted to percent power and is the power output target for the ultrasonic generator. This table allows the user to define a sequence of steps that allows the wires to be efficiently bonded using a minimal amount of energy and minimizing any damage to the wires from the energy applied.

A typical sequence would start with a high force and zero amplitude for a short time period. This squeezes the wires together and bends the wires into the knurling of the anvil and horn. The next step would be at a smaller force with large amplitude for the sonic generator. This will relax the grip on the wires, allowing the ultrasonic vibrations to rub the wires together; cleaning surface contaminates off the wires, and starts the wire bonding action. Additional steps then can be used to force the wires into closer contact and allow bonding using higher forces and lower amplitudes.

A final step can be included with zero amplitude and high force, which would shut off the ultrasonic generator and hold the wires together while the bonds cool off. This last step is important for welding aluminum, holding the bonds together while they cool and not allowing contaminates to enter the bond.

Table 2 illustrates one embodiment of a weld operation having a predefined sequence of force, duration and amplitude settings, as described above. The values in Table 2 may be used to sequence force and amplitude changes during the weld, in order to use the ultrasonic energy being applied more efficiently and impart minimal damage to the material being welded.

TABLE 2

| Force (N) | Duration (mSec) | Amplitude (μm) |
|---|---|---|
| 700 | 250 | 0.00 |
| 500 | 500 | 40.0 |
| 750 | 400 | 26.0 |
| 1550 | 300 | 20.0 |
| 500 | 500 | 0.00 |

For example, when a weld is started:

1) The wires are compressed with a force of 700 N and a 250 mSec timer started.
2) When the timer expires, the second step will be processed—the force then is reduced to 500 N. Because this is the first step with amplitude defined, the start height measurement will be taken when this step's force is achieved. This start height will be compared to the recipe's expected start height. Deviation from this expected start height indicates wires or wire strands are missing from the weld or there are incorrect wires in the weld. If the measurement is within acceptable limits, the ultrasonic generator will be switched on with amplitude of 40 um, and a 500 mSec timer started. (Otherwise, the weld will be aborted and alarmed.)
3) At timer expiration, the third step will be processed—the force will be increased to 750 N, the ultrasonic amplitude will be decreased to 26 um, and a 400 mSec timer started.
4) At timer expiration, the fourth step will be processed—the force target will be changed to 1550 N and the ultrasonic amplitude decreased to 20 um. Because the next step has amplitude of 0.0, a timer will not be started and the system will stay at this step's force and amplitude until the weld completes and the ultrasonic shut off.
5) When the weld completes, the last step will be processed—a hold step, because there is no amplitude defined—the force reduced to 500 N and held for 500 mSec.
6) When the last step's timer expires, a force compensated height measurement will be taken and tested against the expected height for this weld. Deviation from the expected weld height can be used to detect faulty welds.

If the weld completes during a weld step, that step will be aborted and the step processing will continue from the next step found with 0.0 amplitude (the first hold step), or the weld will end if there are no hold steps.

If the weld is in progress and the timer expires for the last of the weld steps, we will hold at the current force and amplitude until the weld completes. We will then process the hold steps, if there are any. Other tables using these variables may be generated by the skilled artisan based on the disclosure set forth herein.

In other embodiments, a weld operation may be defined by a sequence of target heights or widths, with increasing force being applied until the target height or width is achieved. In yet other embodiments, a weld operation includes one or more force profiles to be applied during each step, where a force profile defines the force to be applied throughout the duration of the step (constant, increasing, decreasing, or varying). Each step in the weld operation may also specify an amplitude profile, which defines the amplitude to be applied during the step. In yet another embodiment, a weld operation may be defined as a single step having a force profile and amplitude profile.

In many embodiments, a weld operation will start with squeeze step(s) [0.0 amplitude], contain one or more weld step(s) [non-zero amplitude], and end with hold step(s) [0.0 amplitude].

In yet another embodiment, a weld operation may be defined by one entry with a force and an amplitude value. The duration could be anything. When this list was processed, the system would increase the force up to the desired force, measure the start height, and, if it was within specification, turn on the ultrasonic generator at the defined amplitude. The desired force would be maintained for the duration of the weld. Time to weld is another mode of operation where the amplitude and force are defined, and the weld operation conducted for a pre-set time, the expiration of which results in the weld operation ceasing.

There are two additional position reporting encoders, 156 and 158. Differential transformer encoder 156 is located on a width frame, 120, (shown on FIG. 11A and FIG. 7) that is modulated by the position of a ferromagnetic electrically conducting sensor strip, 160, on width anvil assembly 85 (shown on FIG. 9). Differential transformer encoder 158 is located on the back side of the front leg of the main tooling frame assembly, 80 (FIG. 5 shown in phantom) that that is modulated by the position of a ferromagnetic electrically conducting sensor strip 162 on height anvil assembly 86 (shown in FIG. 12 and FIG. 13). These two additional position reporting encoders 156 and 158 more accurately detect the position of the height and width anvil assemblies than the encoders in the motors.

Figure 8:
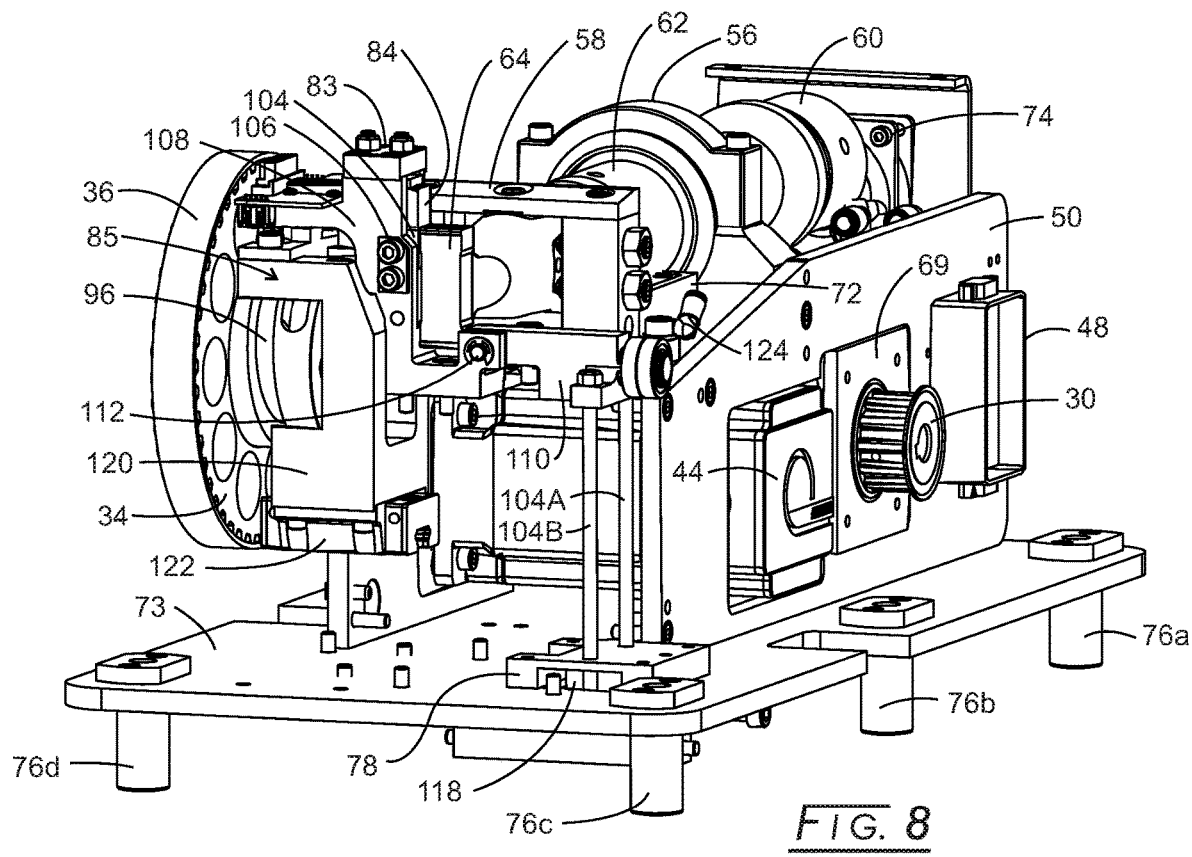
FIG. 8 is an isometric view of the disclosed weld splicer showing the width anvil assembly therein.
Figure 9:
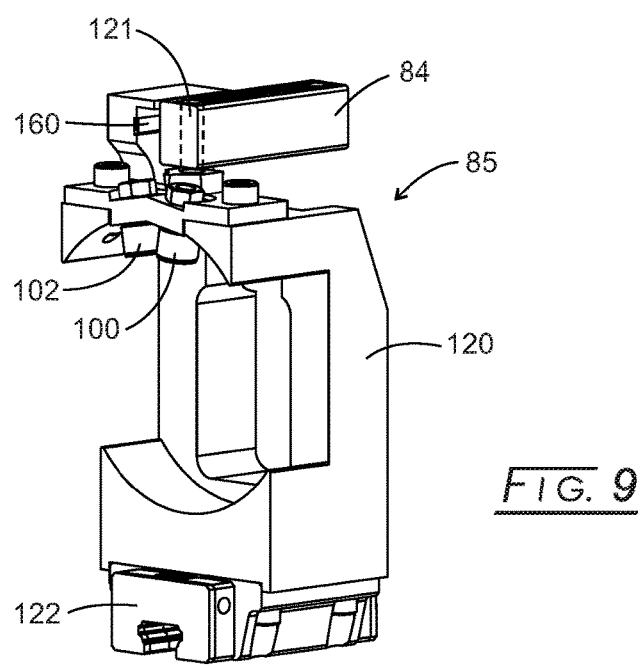
FIG. 9 is an isometric view of the carriage or width frame.

Further on width anvil assembly 85 is illustrated in FIGS. 8 and 9. Main tooling frame 80, height anvil assembly 86, and the cutter cylinder assembly 46 have been removed in FIG. 8 for better illustrating width anvil assembly 85. A width frame, 120, is coupled to width anvil 84 by tow shaft or pin 121 (seen in FIGS. 9 and 10). It has a travel range that allows for a 0 to 16 mm width opening. Width anvil 84 is positioned to control the loading and unloading of the wire bundles, as well as precisely controlling the weld width of the finished weld nugget. Width anvil 84 can be turned end for end and top for bottom to provide different weld surfaces. Precise linear movement of this assembly is provided by a single linear bearing carrier, 122, on rail, 123 that is attached to main tooling frame 80 (shown on FIGS. 10 and 11). This is possible because of the symmetric balanced cam linkage being located in-line with the weld zone with a minimum turning moment between the cam followers 100 and 102 and the weld zone lateral welding forces. An air port, 124, connected with an air manifold, 72, that cools stack assembly 54 also can be seen in FIGS. 8 and 15.

Height anvil assembly 86 is seen in FIGS. 10-11. Height cam assembly 28 is coupled to the height anvil assembly 86 with a single cam follower, 126, that rides in cam track 98

(see FIG. 7). A height side guide, 128, is held in place by two socket head cap screws (SHCS), 130A and 130B. Height side guide 128 sits atop a height anvil base, 132. Height side guide 128 is positioned in order to provide a gap between it and the side of the horn 64 (sonotrode). This gap is maintained as height anvil assembly 86 is moving up and down as well as during the compressive weld forces. Too large of a gap will allow wire strands to enter the gap and jam the mechanisms. Any wire strands that slip into the gap will not be welded and result in an unacceptable weld. If the gap is too small, resulting in the side guide 128 making contact with horn 64, the tooling can be permanently damaged from the generated heat. In order to aid in making the proper gap setting, the side guide 128 is positioned with a small eccentric cam assembly, 134, which provides precise adjustment of the gap. Side guide 128 can be rotated end for end to provide two work surfaces due to usual wear. Height anvil 84 is driven to its retracted and extended positions by means of a pneumatic air cylinder, 136.

In FIGS. 11 and 11A, width anvil assembly 85 is shown in cross-section. Many of the components were already described above. SCHS, 138, holds down width anvil retainer, 83, underneath which a wear plate, 142, is located. Wear plate 142 is adjusted by an adjuster, 140, to width anvil 84 that slides on slide guide 104 over top of horn 64. Side guide cam assembly 106 maintains the gap between width anvil 84 and horn 64 previously described above. Height anvil retainer 89 has similar components for height anvil 88.

Figure 12:
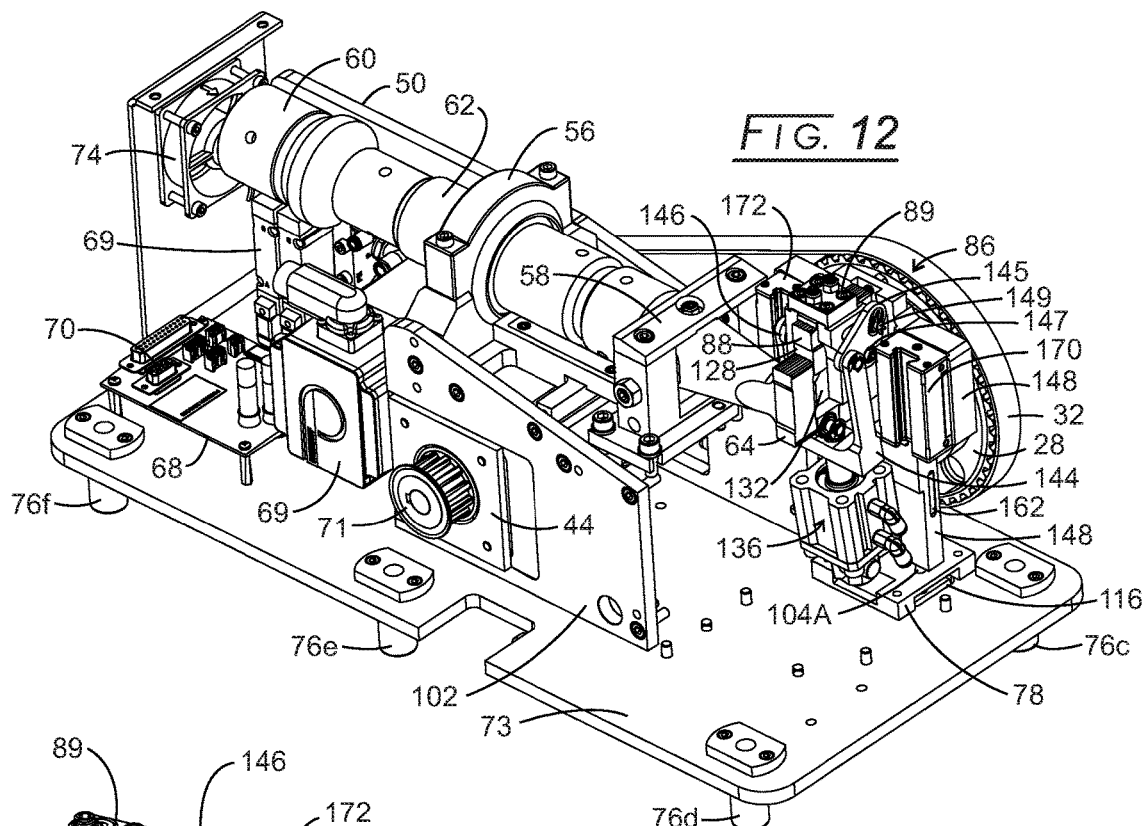
FIG. 12 is an isometric view of the stack assembly in its mounted position.
Figure 13:
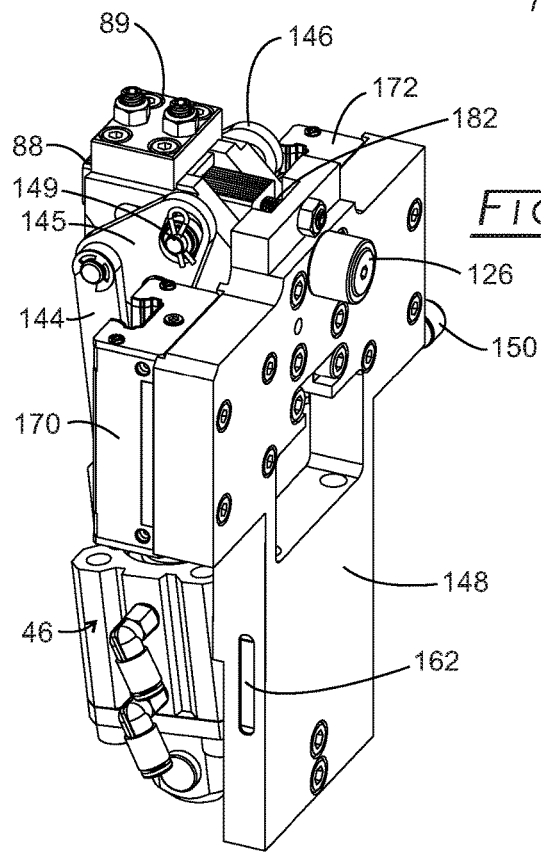
FIG. 13 is an isometric view of the height anvil assembly.
Figure 14:
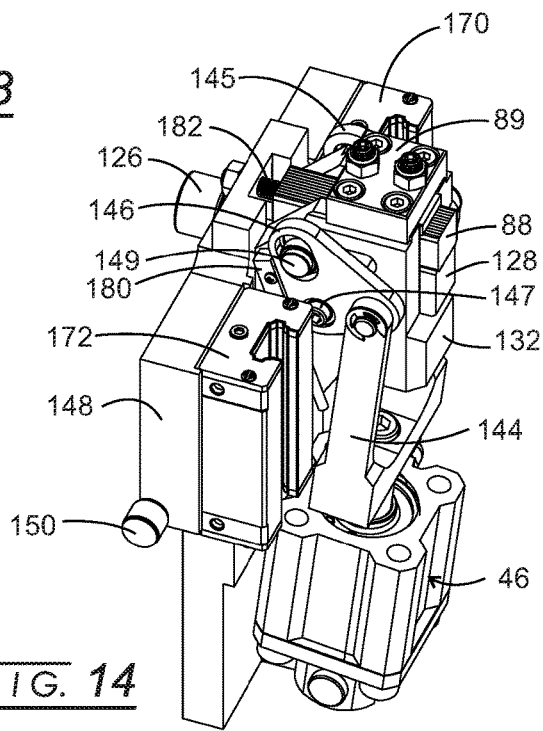
FIG. 14 is an isometric view of the height anvil assembly in FIG. 13 from the other side.

Stack assembly 52 is seen again in FIG. 12 along with a motor mounting plate, 102. Main tooling frame 80, width anvil assembly 85, and cutter cylinder assembly 46 have been removed in FIG. 12 for better illustrating height anvil assembly 85. Of particular interest in FIGS. 12-14 is the continuing description of height anvil assembly 86, which is to be taken in connection with the description of FIGS. 10 and 10A. Pneumatic cylinder assembly 136 is seen attached to a height anvil clevis, 144, that is attached to a front and rear actuator plates, 145 and 146, that pivot on shaft 147 through a connector pin, 149, for moving height anvil 88 in its extended and retracted positions. A sensor, 180, detects the position of plate 146 when height anvil 88 is in its retracted position (shown in FIG. 14). Retracted position of the height anvil 88 is maintained by a stop, 182. A height anvil base plate, 148, holds the components for the instant assembly. Height anvil base plate 148 also holds two linear bearing carriers, 170 and 172 (also seen in FIG. 4). Precise linear movement of height anvil assembly 86 is provided by two linear bearing carriers 170 and 172 that ride on rails, 174 and 176, that are mounted to main tooling frame 80 (shown in FIG. 4). A roller, 150, mounted to the outer edge of the height anvil base plate, 148, contacts the outer inside edge of height cam 28 stabilizing it when the downward force is applied to height anvil 88. The slot for the inductive sensor strip 162, described previously, is seen in height anvil base plate 148.

Figure 16:
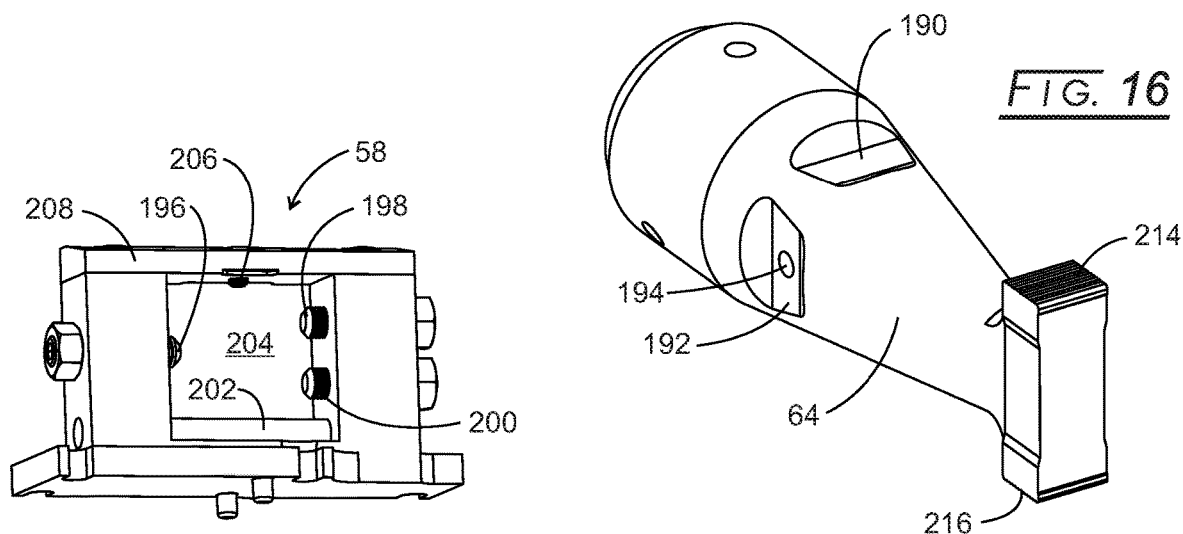
FIG. 16 is an isometric view of the horn.
Figure 17:
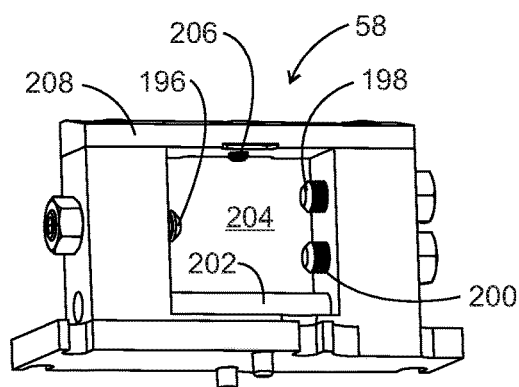
FIG. 17 is an isometric view of the front nodal support.
Figure 18:
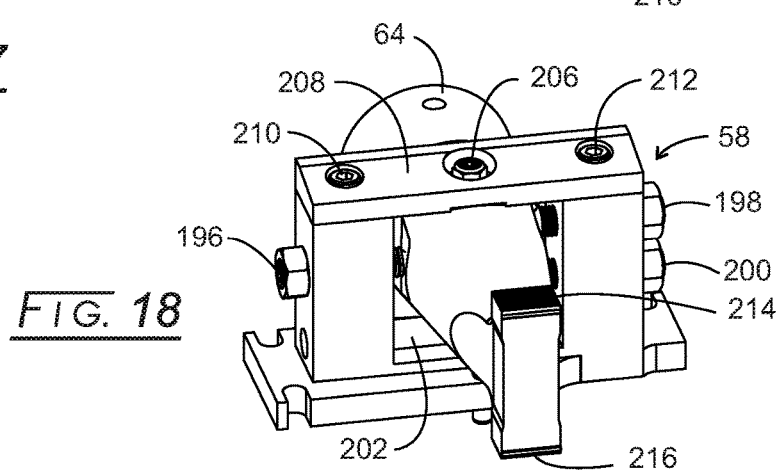
FIG. 18 is an isometric view of the front nodal support retaining the horn.
Figure 19:
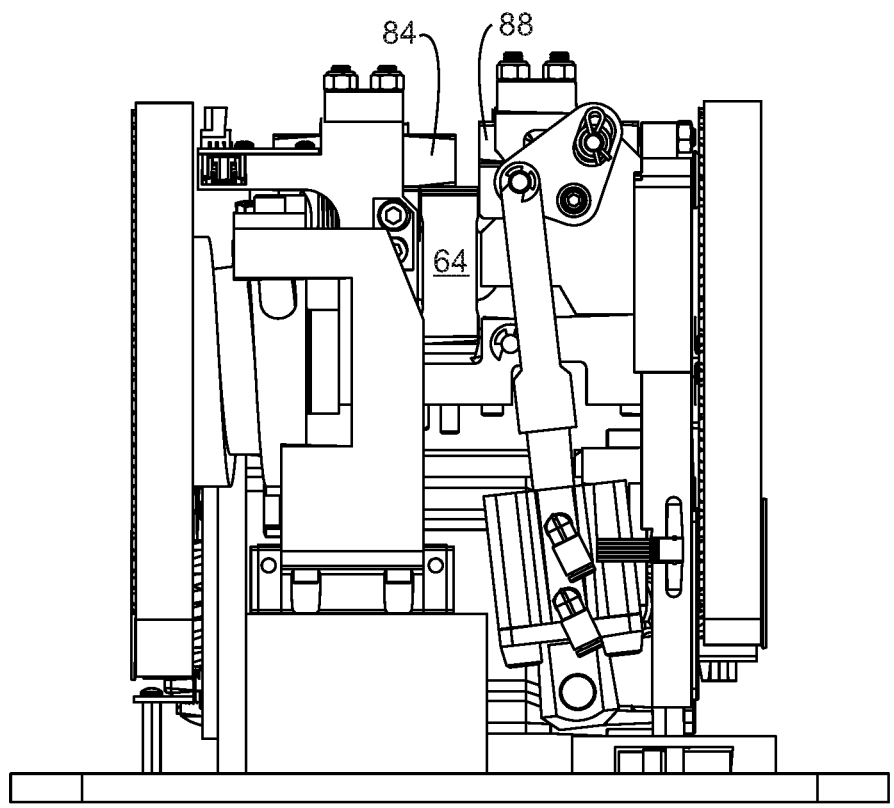
FIGS. 19-22 are front views of the disclosed weld splicer with the stack cover and finger safe cover assemblies removed and showing the various positions of the anvils through the weld splicing process.
Figure 20:
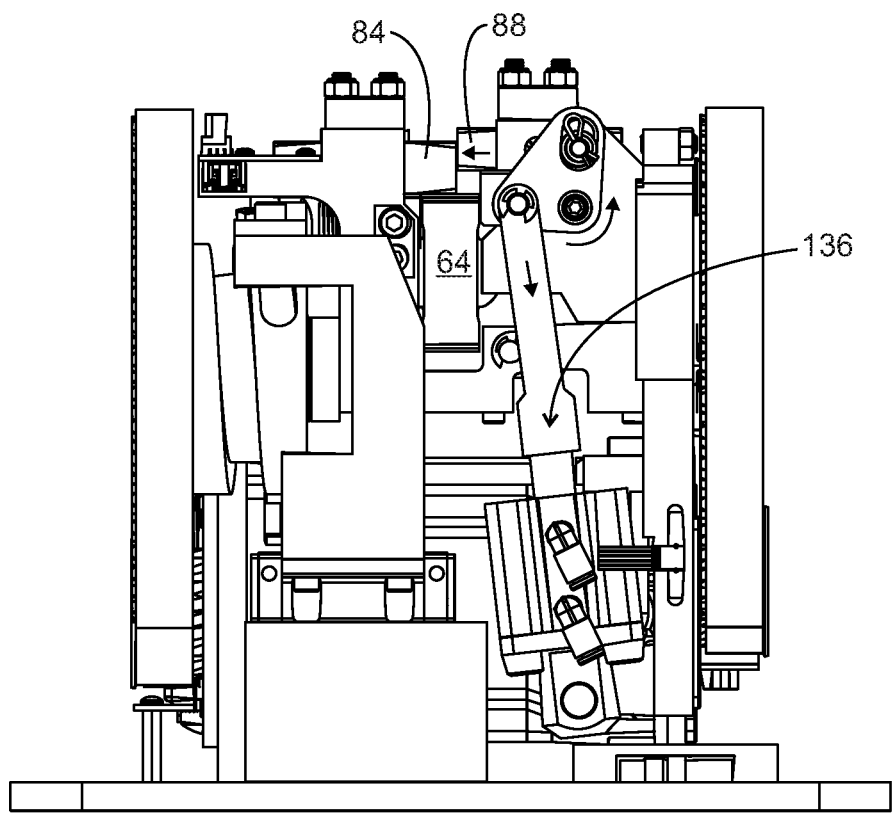
Figure 21:
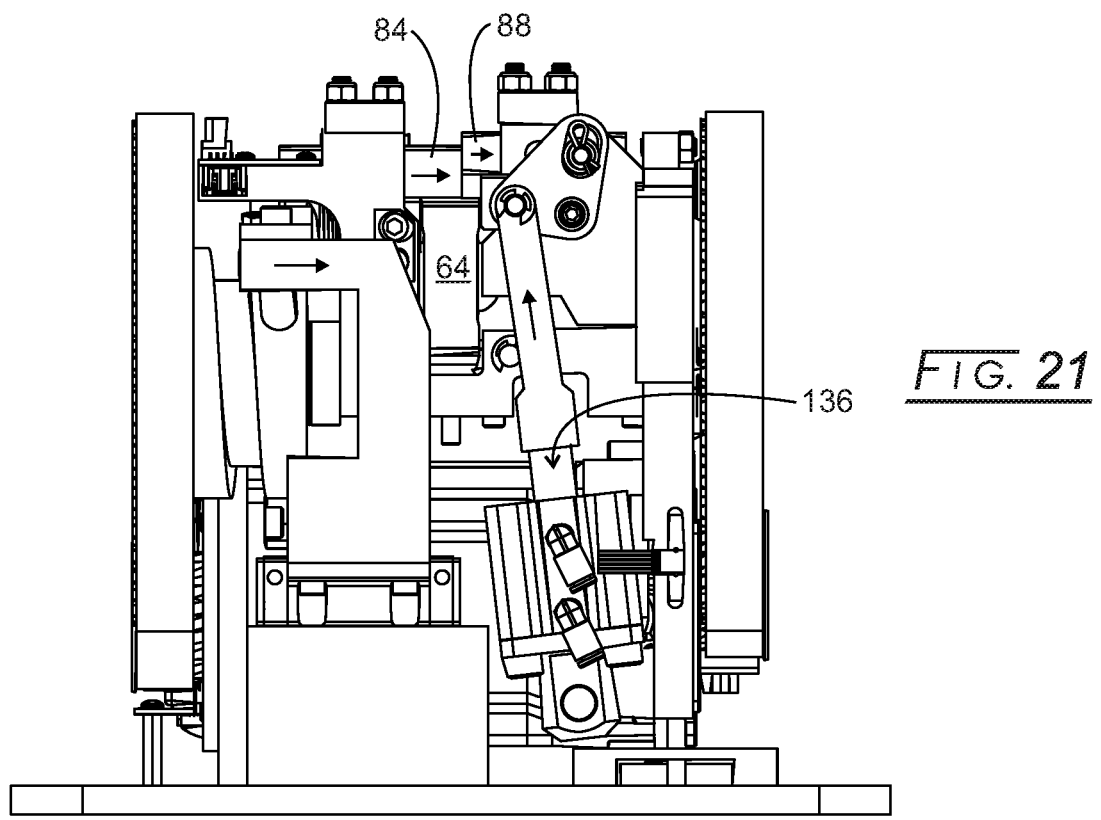
Figure 22:
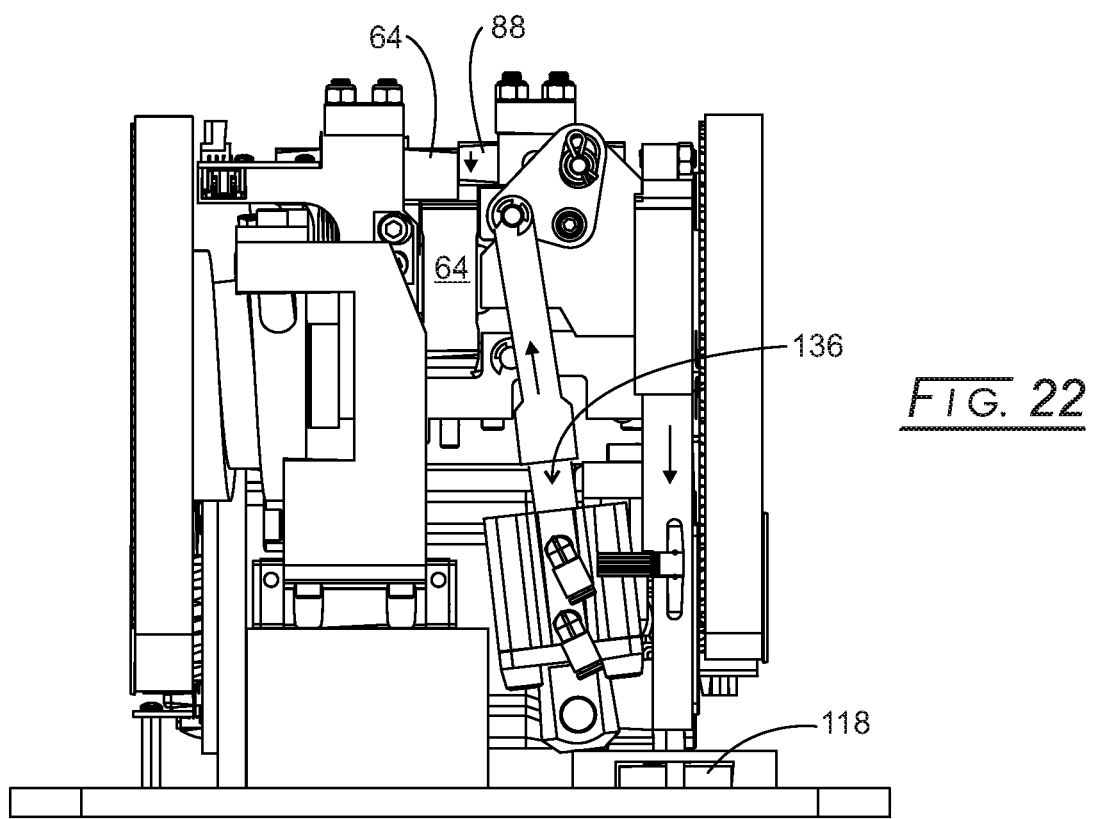

FIGS. 15-18 show stack assembly 52 and the various components thereof. FIGS. 16-18 shows front nodal support assembly 58 and the horn 64. Horn 64 has 4 flats, around its center, only two of the flats, 190 and 192, show in the drawings. The other two flats are similar to flats 190 and 192, but on their opposite sides. The top and bottom flats are parallel to each other and the two side flats are 90 degrees to the top and bottom flats and parallel to each other. There is a dimple, 194, milled in the side flat(s) 192 that accepts a setscrew, 196, on the left side of the front nodal support assembly 58. Dimple 194 gives a longitudinal precise location of horn 64. The right side of front nodal support assembly 58 has two setscrews, 198 and 200, that set the left to right placement of horn 64. There is a bar, 202, at the bottom of an opening, 204, in front nodal support assembly 58 that is parallel to the base plate 73. Bar 202 holds the horn 64 on its bottom flat in the front nodal support assembly 58. Horn 64 is held down by a setscrew, 206, in a top plate, 208, of front nodal support assembly 58. Horn 64 can be rotated 180 degrees in front nodal support assembly 58 by simply removing two screws, 210 and 212, that hold top plate 208 to front nodal support assembly 58 and loosening the setscrew 196. Horn 64 has two hammerheads, 214 and 216, with corrugated surfaces at its proximal end. Rotating horn 64 by 180 degrees allows the use of the other hammerhead and sets it in the same precise location through the front nodal support assembly 58. The waves on the faces of the "hammerheads" grip the wire strands so the wires in contact with the horn move with the sonic motion, while the wire strands in contact with the height anvil are held stationary, resulting in the required scrubbing interaction.

The ultrasonic welding operation steps are illustrated in FIGS. 19-22, with each step represented by each such figure, respectively.

I. Initially, width anvil 84 is in a retracted release position. This assists the operator in loading the wires on top of each other. Height anvil 88 also is in the release position and retracted to give clear entry for positioning the wires. This is the open aperture mode.

II. The wires are all contained in the closed weld area in the closed aperture mode. Height anvil 88 is moved over by pneumatic cylinder assembly 136 contacting with anvil 84. The weld area may be closed before moving width anvil 84 into the final weld position so that all wire strands stay within the area and no strands slip between the opposing anvil faces.

III. Width anvil 84 has moved into the final weld width position. Width anvil 84 pushes height anvil 88 back. Pneumatic cylinder assembly 136 is still actuated, but will allow height anvil 88 to move back because air is compressible. Intimate contact between the two anvil faces is required to keep all of the wire strands in the weld area and not accidentally between tooling faces.

IV. Height anvil 88 moves downward to compress the wire strands. When weld force load cell 118 reports the applied force, and the downward rate of movement diminishes, the start weld height is determined and evaluated for fit to the quality requirements. If the start height is within limits, the weld commences. The height is measured again at the end of the weld and if it is within limits, height anvil 88 and width anvil 84 return to the loading position and the cycle ends.

Depending on the process setup parameters, a failed weld may keep the tooling closed, locking the failed weldment in place. An authorization, then, can actuate the "bad wire" device to sever the wire from the weld joint before releasing the weldment. This ensures the bad weld will not be placed into production. Commercial wire splicers presently can only guarantee 5.5% of copper area detection. Weld splicer machine 10 has been successful down to 3% of copper area with regard to missing wire detection.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. An improved ultrasonic welding apparatus where metal pieces to be joined are placed in a weldment zone having a height and a width where the metal pieces are subjected to pressure though a compressive height anvil and an adjustable width anvil, and intimate contact is made with a sonotrode of an ultrasonic stack, the improvement comprising:
   a first electric motor actuating movement of the height anvil to develop a compressive force for ultrasonic welding of the metal pieces;
   and a software algorithm that includes a pre-defined sequence of force, duration, and amplitude combinations that includes the steps of:
   (a) commencing with a given force and zero amplitude for a time period for squeezing the metal pieces together and bending the metal pieces into knurling of the anvil and the sonotrode;
   (b) applying a smaller force with an increased amplitude for the sonic generator one or more times in sequence and for given times with successively smaller forces and larger amplitudes for precleaning and then bonding the metal pieces together; and
   (c) concluding with zero amplitude and an increased force, which shuts off the ultrasonic generator and holds the metal pieces together for cooling;
   wherein welding is aborted when is there is deviation from an expected start height, indicative of missing metal pieces.

2. The improved apparatus of claim 1, wherein the first electric motor is one or more of a servo motor, a torque motor, a variable frequency drive motor, or a step motor.

3. The improved apparatus of claim 1, further comprising a sensor for measuring the compressive force developed.

4. The improved apparatus of claim 3, wherein the sensor is a load cell or monitored motor torque.

5. The improved apparatus of claim 3, wherein the sensor directly measures a load on the height anvil independent of the ultrasonic stack.

6. The improved apparatus of claim 4, wherein the sensor is a load cell and further comprising a software algorithm that compensates for deflection of the load cell sensor and lost motion in the first electric motor actuating movement.

7. The improved apparatus of claim 1, wherein the first electric motor is connected to the height anvil by one or more of pulleys, belts, cams, or ballscrews.

8. The improved apparatus of claim 1, further comprising a controller to control an ultrasonic amplitude of the sonotrode in synchronization with a modulated compressive force during welding.

9. The improved apparatus of claim 1, further comprising a second electric motor to position the width anvil before and during welding.

10. The improved apparatus of claim 9, wherein the second electric motor is one or more of a servo motor, a torque motor, a variable frequency drive motor, or a step motor.

11. The improved apparatus of claim 9, wherein the second electric motor is connected to the width anvil by one or more of pulleys, belts, cams, or ballscrews.

12. The improved apparatus of claim 1, wherein the weldment zone includes an array of infrared sensors to sense the presence of a user's fingers therein.

13. The improved apparatus of claim 9, wherein said first and second electric motors contain position sensors.

14. The improved apparatus of claim 1, which is air cooled.

15. The improved apparatus of claim 1, wherein a software algorithm includes a height compensation.

16. The improved apparatus of claim 15, wherein the software algorithm includes a pre-defined sequence of force, duration, and amplitude combinations;
   wherein the force and duration are applied sequentially during welding of the metal pieces, and
   wherein welding is aborted when is there is deviation from an expected start height, indicative of missing metal pieces.

17. The improved apparatus of claim 1, wherein the metal pieces comprise metal wires.

* * * * *